US008305439B2

(12) United States Patent
Cheng et al.

(10) Patent No.: US 8,305,439 B2
(45) Date of Patent: Nov. 6, 2012

(54) PAN, TILT, ZOOM DOME CAMERA WITH OPTICAL DATA TRANSMISSION METHOD

(75) Inventors: WeiCheng Cheng, Shanghai (CN); Hao Wang, Shanghai (CN); Xin Xu, Shanghai (CN)

(73) Assignee: Honeywell International Inc., Morristown, NJ (US)

( * ) Notice: Subject to any disclaimer, the term of this patent is extended or adjusted under 35 U.S.C. 154(b) by 840 days.

(21) Appl. No.: 12/327,926

(22) Filed: Dec. 4, 2008

(65) Prior Publication Data
US 2010/0141760 A1 Jun. 10, 2010

(51) Int. Cl.
H04N 7/18 (2006.01)
(52) U.S. Cl. ............... 348/143; 348/197; 348/207.99; 348/359; 398/115; 398/117; 398/114
(58) Field of Classification Search ............ 348/143, 348/197, 207.99, 359; 398/115, 114, 117
See application file for complete search history.

(56) References Cited

U.S. PATENT DOCUMENTS

| 6,246,810 | B1* | 6/2001 | Harris et al. ............ 385/26 |
| 7,582,183 | B2* | 9/2009 | Tang ............ 156/345.25 |
| 7,821,550 | B2* | 10/2010 | Yamashina ............ 348/231.7 |
| 8,004,561 | B2* | 8/2011 | Mottur et al. ............ 348/143 |
| 2003/0039015 | A1* | 2/2003 | Vujkovic-Cvijin et al. .. 359/187 |
| 2003/0090353 | A1* | 5/2003 | Robinson et al. ............ 335/220 |
| 2004/0109059 | A1* | 6/2004 | Kawakita ............ 348/143 |
| 2004/0189800 | A1 | 9/2004 | Berkey et al. |
| 2005/0024523 | A1* | 2/2005 | Vernon ............ 348/370 |
| 2006/0007350 | A1 | 1/2006 | Gao et al. |
| 2006/0291866 | A1* | 12/2006 | Alwan et al. ............ 398/140 |
| 2007/0140487 | A1 | 6/2007 | Meier et al. |
| 2008/0055409 | A1 | 3/2008 | Mars et al. |

(Continued)

FOREIGN PATENT DOCUMENTS
EP 1 463 326 A1 9/2004
(Continued)

OTHER PUBLICATIONS

Article 'How stuff works—How fiber optics work' to Freudenrich. ("Freudenrich") [http://electronics.howstuffworks.com/question402.htm].*

(Continued)

*Primary Examiner* — Phuoc Nguyen
*Assistant Examiner* — June Sison
(74) *Attorney, Agent, or Firm* — Husch Blackwell LLP

(57) ABSTRACT

A surveillance camera that includes a device for capturing video signals and that converts the video signals to optical signals. The surveillance camera has a first component with a first aperture and a second component with a second aperture. The second component engages the first component such that the first component rotates relative to the second component. The surveillance camera has a first optical component that extends through the first aperture of the first component. The surveillance camera also has a second optical component that extends through the second aperture of the second component. The first optical component is separated from the second optical component by a gap. The first optical component is operatively connected to the device. The first optical component receives the optical signals and transmits the optical signals to the second optical component across the gap to permit a continuous rotation of the first component relative to the second component. The second optical component communicates the optical signals to a destination.

28 Claims, 5 Drawing Sheets

U.S. PATENT DOCUMENTS

2010/0226607 A1\* 9/2010 Zhang et al. .................... 385/26
2010/0283854 A1\* 11/2010 McKaughan et al. ........ 348/144

FOREIGN PATENT DOCUMENTS

| | | | |
|---|---|---|---|
| GB | 2 384 635 | A | 7/2003 |
| JP | 2008129406 | A  \* | 6/2008 |

OTHER PUBLICATIONS

Japan Patent Application No. JP 2008129406 A [English machine translation].\*

U.S. Appl. No. 61/127,320, filed May 12, 2008.\*

\* cited by examiner

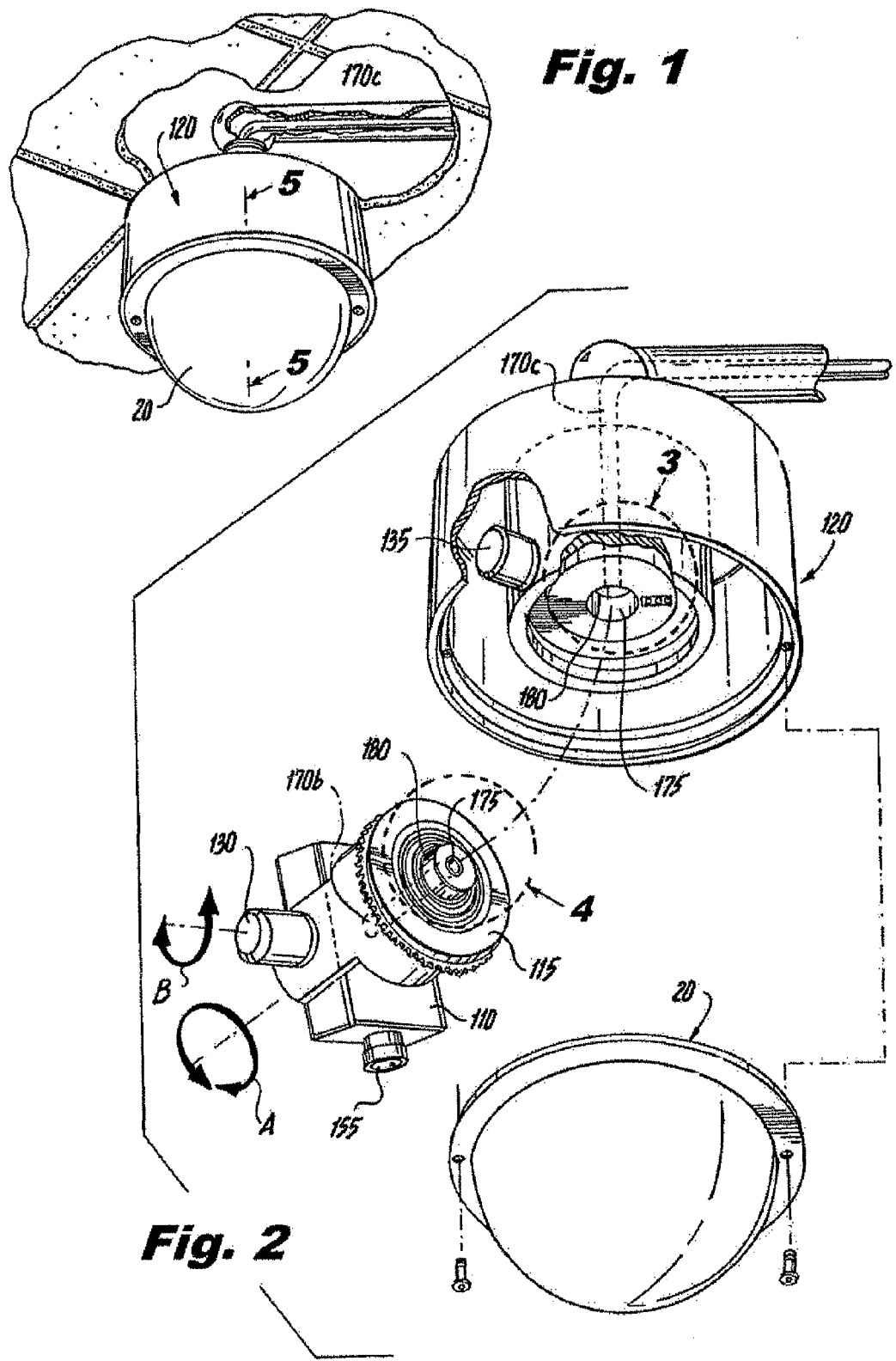

PAN, TILT, ZOOM DOME CAMERA WITH OPTICAL DATA TRANSMISSION METHOD

FIELD OF THE INVENTION

The present disclosure relates to surveillance video cameras. More particularly, the present disclosure relates to a dome pan, tilt, zoom video surveillance camera with an improved transmission method associated with an optical transmission of a video signal.

BACKGROUND OF THE INVENTION

PTZ cameras are known in the art, and are becoming more prevalent in the day-to-day security industry. PTZ stands for Pan, Tilt, and Zoom. A PTZ dome security camera differs slightly from a fixed dome camera in that it can move left and right (commonly referring to as pan) or can move up and down (commonly referred to as tilt). These security cameras also include a zoom feature, making an extremely very feature-rich device that can capture images from a distance away from a target location. Sometimes, the PTZ dome camera may be operated manually.

In this instance, the domed camera has a keyboard and a receiver to operate PTZ functions. An operator, like a security guard, may toggle controls on a keyboard or input device to pan, tilt, or zoom and monitor a target. Most PTZ dome security cameras have a receiver device to receive the control signal, however, other dome shaped security devices can include an automated functionality. Under this automated functionality, the PTZ domed camera can automatically view an area or can use triggers to induce movement by the camera, such as using an object tracker, or object recognizer. The PTZ domed camera may take a number of motions. For example, a PTZ security camera may sweep a defined area for a time interval. Additionally, the PTZ camera may detect motion, and based on control logic can reposition the PTZ camera to detect one or more desired conditions. PTZ dome cameras often include a semi-translucent dome that is obscured. This makes it difficult for an individual to notice if they are being recorded by the camera or monitored. PTZ dome camera also may include different configurations, including weatherproofing, day, or night configurations.

The present state of the art in dome video cameras includes associated electrical and mechanical components. The camera generally is mounted on a rotatable platform/section. This platform is covered by a dome, and connects the camera to electrical power, and to a data network of a security system. This is achieved, in some embodiments, by using a multiple conductor mechanical slip ring assembly. Dome cameras are frequently mounted in the ceiling (or on a pole, wall or roof) at a strategic location above the protected premises. The dome camera is rotatably mounted and driven by a pan motor about a generally vertical axis. Dome cameras can rotatably pan about the vertical axis to provide a 360-degree panoramic view of the protected premises. The camera can also be also rotatably mounted and driven by a tilt motor about a generally horizontal axis. This provides a vertically variable field of view. The view is variable from a view just below the horizon to a view more vertically below the dome camera. In this manner, two axes of rotational freedom provide the camera with a versatile capability of viewing many different areas of the protected premises.

The rotatably mounted camera typically includes a mechanical slip ring assembly with a plurality (e.g. 6) of slip rings positioned around a vertical axis of rotation to provide for the transfer of electrical power to all of the components on a rotatable platform/section. The conductors transfer signals from the video camera and its associated electrical circuitry. The conductors also transfer power to the pan and tilt motors and their associated electrical circuitry. The slip ring assembly also carries video signals from the video camera to the video switching or processing system of the security system. The slip ring assembly further carries control and feedback data signals to, and from, the video camera, pan and tilt motors and other associated electrical components. The mechanical slip ring assembly is one of the more expensive components of a dome camera, has a fair reliability, and frequently any repair work is very labor intensive, and may even result in a complete replacement of the camera.

One significant issue is the advent of using digital signals in PTZ camera, and the resulting interference experienced from transmitting a digital signal via the mechanical slip ring assembly. The digital signal may experience interference from an electrical or magnetic source, or from a faulty connection. If one bit of the digital signal is disturbed, then the resulting signal of 512 bits may experience issues that may question the quality or integrity of the digital signal, and the resulting video received. Additionally, communication protocols and the transmission bandwidth are important to quality. The transmission bandwidth of the slip ring assembly is quite limited at 100 Megabits, and this may not be sufficient for all applications.

SUMMARY OF THE INVENTION

According to a first aspect of the present invention, there is provided a surveillance camera that includes a device for capturing video signals and that converts the video signals to optical signals. The surveillance camera has a first component with a first aperture and a second component with a second aperture. The second component engages the first component such that the first component rotates relative to the second component. The surveillance camera has a first optical component that extends through the first aperture of the first component. The surveillance camera also has a second optical component that extends through the second aperture of the second component. The first optical component is separated from the second optical component by a gap.

The first optical component is operatively connected to the device. The first optical component receives the optical signals and transmits the optical signals to the second optical component across the gap to permit a continuous rotation of the first component relative to the second component with the second optical component communicating the optical signals to a destination.

According to another aspect of the present invention, there is provided an apparatus for capturing images and transmitting images to a destination by transferring optical signals between the surveillance camera and the destination. The surveillance camera has a lens and a number of motor drives that are operable to move the surveillance camera in at least two planes. A housing supports the surveillance camera. The housing has a first aperture.

A second component is also provided. The second component includes a second aperture that engages the housing such that the housing rotates relative to the second component. The surveillance camera also includes a conductor. The conductor is supported by at least one of the housing and the second component. The conductor transfers electrical power from a power supply to the conductor and to at least one of the surveillance camera and at least one motor drive.

The surveillance camera also has a first optical component that extends through the first aperture of the housing. The surveillance camera also has a second optical component that extends through a second aperture in the second component. The first optical component is separated by the second optical component by a gap to permit the housing to rotate about three hundred sixty degrees relative to the second component. The images are captured by the surveillance camera and are converted from a video signal to an optical format. The optical signals are communicated through the first optical component across the gap to the second optical component at a predetermined bandwidth being greater than 100 Megabits.

According to a further aspect of the present disclosure, there is provided a method for capturing video, and transmitting a signal from the surveillance camera to a remote location. The method includes the step of capturing an image using the surveillance camera in a predetermined format and converting the image from the predetermined format to an optical format. An optical signal is transmitted across a gap in the surveillance camera to the remote location.

BRIEF DESCRIPTION OF THE DRAWINGS

The foregoing objects and advantages of the present invention may be more readily understood by one skilled in the art with reference being had to the following detailed description of several embodiments thereof, taken in conjunction with the accompanying drawings in which:

FIGS. 1, 6 and 7 shows a simplified representation of a pan, tilt, zoom dome surveillance camera connected to a ceiling or a second configuration supported on an arm;

FIG. 2 shows an exploded view of the dome camera showing the camera, a translucent dome and two housings for supporting first and second fiber optic components;

DETAILED DESCRIPTION OF THE INVENTION

Figure 3:
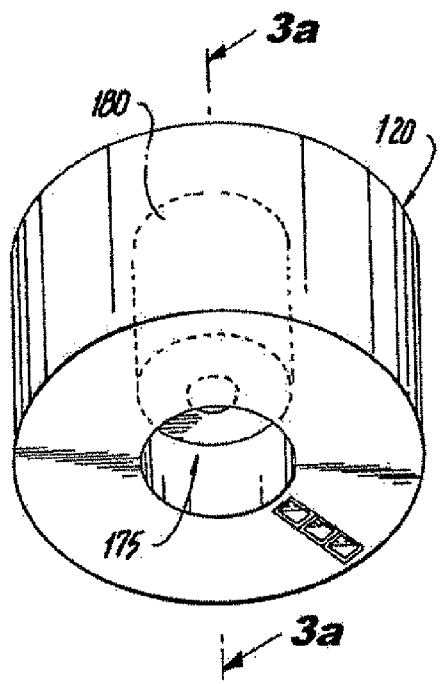
FIGS. 3, 3a and 4, 4a show cross sectional views of a surveillance camera housing and a main body housing.

The present disclosure provides for an improved surveillance camera and an improved method of transmitting data from a real time surveillance video camera that captures video images. Prior surveillance cameras often transmitted data at a bandwidth that was slow and relatively vulnerable to magnetic or electrical interference. This magnetic or electrical interference can adversely affect data communicated between the surveillance camera and a remote location, which can cause errors. These errors can lead to a loss of quality of the digital signal. The present disclosure provides for an improve interface between a rotating surveillance camera and a housing. The present disclosure also provides for a fiber optic connection that has an increased data transmission bandwidth that is not affected by electromagnetic interference.

Furthermore, the present disclosure also provides for a fiber optic connection that includes a gap 170a between a first fiber optic portion 170b and a second fiber optic portion 170c. An optical laser signal is communicated through air gap 170a. The air gap 170a is positioned between the first fiber optic portion 170b and second fiber optic portion 170c and permits the camera 110 to continuously rotate 360 degrees in the direction of reference letter A shown in FIG. 5 while communicating signals through the air gap 170a at a high data rate.

In operation, video signals are captured by the camera 110. Video signals are communicated to a transmitter 200 along line 202 and are converted to a laser optical signal by the laser transmitter 200 and then are transmitted to the first fiber optic portion 170b. The laser signal then is transmitted over the air gap 170a, which is advantageous as the fiber optic portions 170b and 170c do not impede a surveillance camera housing 115 from rotating 360 degrees relative to a main body housing 120 in a continuous fashion. The laser signal is then received by second fiber optic portion 170c, and then is communicated to a laser receiver 205, where the optical signal can be converted back into a video signal for display to an individual, or further communicated to another destination. Thus, the video signal is communicated at a very high rate of transmission in the range of about 100 Gigabits.

The surveillance camera system according to the present disclosure is generally represented by reference numeral 100. In the illustrated embodiment, the system includes a surveillance camera 110 connected to a surveillance camera housing 115.

Surveillance camera housing 115 is rotatably connected to a main body housing 120 at rotating pivot point 125 in such a manner so that surveillance camera housing 115 rotates three hundred and sixty degrees relative to the main body housing 120 without tangling any fiber optic component that extends through the housings 115, 120. In one embodiment, the surveillance camera housing 115 may rotate relative to the stationary main body housing 120 in the direction of reference arrow A or in an opposite direction relative to reference arrow A. In one embodiment, the surveillance camera housing 115 may tilt about 180 degrees relative to the stationary main body housing 120 in the direction of reference arrow B or in an opposite direction thereof. It should be appreciated that these ranges are only illustrative and form no limitations to the present disclosure.

Figure 6:
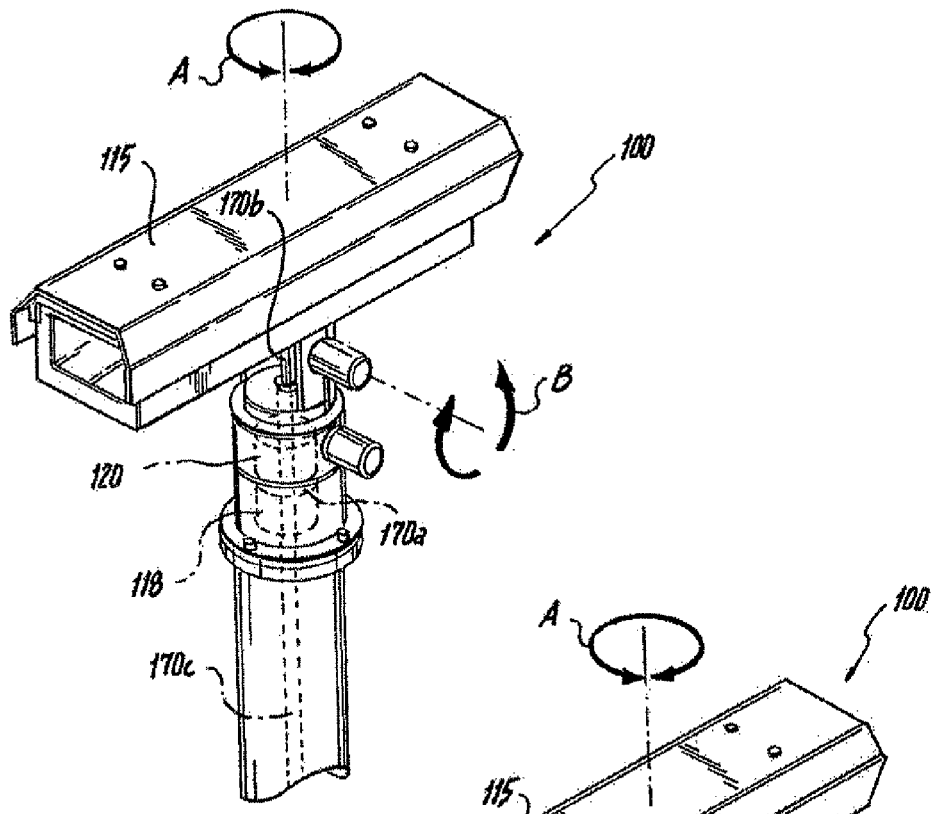
Figure 7:
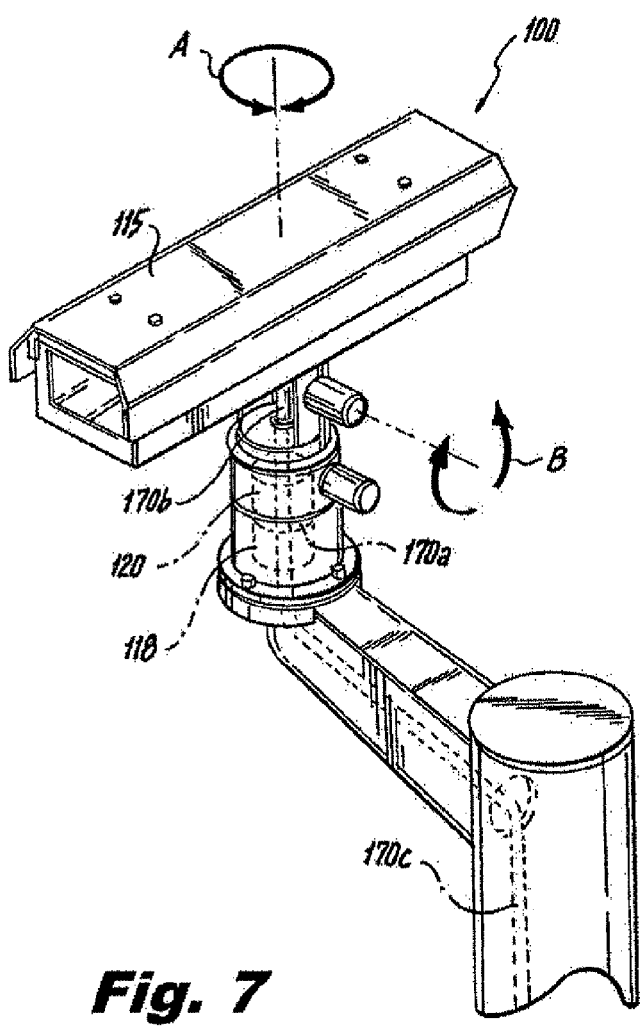

In the illustrated embodiment, the main body housing 120 is connected to a ceiling or similar support structure to mount the surveillance camera 110 above the ground, such as, for example, in an orifice in a ceiling spaced above a floor as shown in FIG. 1. In yet another embodiment, the main body housing 120 can be supported by a pedestal, or similar support structure so the main body housing 120 is at a sufficient distance to capture images as shown in FIGS. 6 and 7. A second housing 118 may be provided in FIG. 6 with a gap 170a between housings 120 and 118 with a similar functionality as discussed above.

A hemispherical dome 20, as is known in the art, encloses the surveillance camera 110, and surrounds the surveillance camera 110. The camera 110 may record in an undetected manner from the outside as shown in FIG. 2. Screws or the like can fasten dome 20 to the housing 115 as shown in FIG. 2.

Turning again to FIG. 5, the surveillance camera 10 includes a pan, tilt, and zoom function. Generally, camera 110 captures real time images of a selected area and transmits the video images to a remote destination, such as, a viewing operator, or to a recording device. The surveillance camera 110 may operate independently, or alternatively may operate within a group of a number of surveillance cameras with each recording or capturing images in real time. The surveillance camera 110 is coupled to one or more motor drives. Motors 130 and 135 are operable to move the surveillance camera 110 three hundred sixty degrees in one axis, and 180 degrees in another axis.

In the illustrated embodiment, the system 100 includes a pan motor drive 130 and a tilt motor drive 135. Motor drives 130 and 135 are electric motors 130, 135 and are coupled to a controller 140. Controller 140 can control each of the electric motors 130, 135 from a remote location, or alternatively, in an automated manner. Controller 140 is operatively connected to each of the motors 130, 135, and the surveillance camera 110 by sending signals through a central bus 150. In the illustrated embodiment, the system 100 also further comprises a memory 145. Memory 145 is operatively connected to the bus 150 and stores program instructions associated with the system 100. The surveillance camera 110 includes at least one motor 130 for panning functionality, and at least a second motor 135 for tiling functionality; however, these functions can be accomplished alternatively by one motor. The surveillance camera 110 also includes a lens assembly 155. Lens assembly 155 is for providing a controllable and remote lens focus, and lens zooming functions. The surveillance camera 110 includes a suitable video circuit (not shown) that converts received images to a video signal, which is communicated to transmitter 200 along arrow 202.

In the illustrated embodiment, the surveillance camera housing 115 is a resilient thermoplastic member. Housing 115 is suitable to support the surveillance camera 110. One or more leads 160a, 160b, 160c extend through the surveillance camera housing 115 as shown. Lead 160a is operatively connected to motor drive 130 and provides control signals to the drive 130 from the bus 150. Lead 160b and 160c can be connected to motor drive 130 and also connected to the camera 110. Leads 160b and 160c are coupled to conductors 165b and 165c. Leads 160b and 160c can provide power to the surveillance camera 110 and the drive 130 from power supply. Control over the zoom and tilting functions of the surveillance camera 110 is made by controller 140, which supplies signals to bus 150. Leads 160a, 160b, and 160c may have various configurations and the illustrated embodiments forms no limitations to the present disclosure.

Each of the leads 160a through 160c are connected to a conductor 165a, 165b, 165c. Conductors 165a, 165b and 165c are each disposed on at an end of the surveillance camera housing 115. It should be appreciated that the conductors 165a, 165b, 165c are connected between the main body housing 120 and the surveillance camera housing 115 to allow the surveillance camera housing 115 to rotate in the direction of reference letter A relative to the main body housing 120, and still provide electrical power to the various relevant components of the surveillance camera 110 during rotation.

The surveillance camera 110 captures the video images in a digital manner. Previously, communicating the digital signal using a physical contact via conductors 165a through 165c can result in lower bandwidth, and low quality because the signal can be interfered with due to electromagnetic and transient interference. The present disclosure remedies this problem in the art by communicating power using the conductors 165a through 165c and then converting the video signal to an optical signal. The optical signal is provided to first optical portion 170b. The optical signal is then transmitted across an air gap 170a. The optical signal is then communicated to a second optical portion 170c. In the illustrated embodiment, each of the surveillance camera housing 115 and the main body housing 120 includes an aperture shown in cross section in FIG. 1 collectively as reference numeral 175.

The first optical component portion 170b extends through the surveillance camera housing 115, while the second optical component 170c extends through the main body housing 120. Air gap 170a is positioned between the housing 120 and the housing 115. In the illustrated embodiment, the first optical component 170b includes an amount of slack to allow the camera 110 to rotate in the direction of reference arrow A. Additionally, leads 160b and 160c also have slack to permit rotation.

In another alternative embodiment, instead of an air gap 170a, a third optical component (not shown) can be disposed between the first and the second optical portions 170b and 170c that allows rotation of the housings 120 and 115 relative to one another. First optical portion 170b faces the second optical portion 170c to communicate the optical signals. In an alternative embodiment, first optical portion 170b can communicate optical signals directly to a receiver 205. In yet another embodiment, transmitter 200 can communicate optical signals directly to the second optical portion 170c and then to receiver 205.

In the illustrated embodiment, the video signal 202 from the surveillance camera 110 is converted to an optical signal and the system 100 uses a laser signal from a laser transmitter 200, which is very advantageous over communicating the video optical signal over other methods. The laser signal does not have any interruption issues, and can transmit data at a relatively higher bandwidth that includes a range that includes 10 Gigabits of data as compared to prior methods of 100 Megabits. Additionally, the optical signal is not impacted by any electrical or magnetic interference, which provides for improved video quality, when received.

Figure 3A:
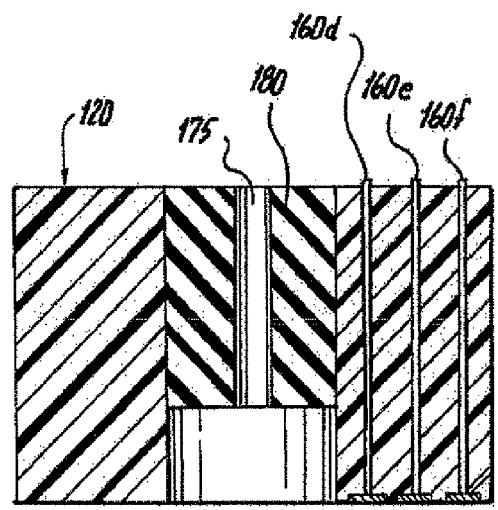

Turning to FIGS. 3, and 3a, there is shown a bottom perspective view and a cross sectional view of the main body portion 120. Main body portion 120 is generally cylindrically shaped and includes an aperture 175. The second optical portion 170c (shown in FIG. 2) extends through the aperture 175. In the exemplary embodiment shown, a protective material 180 extends around the second optical portion 170c shown in FIG. 2 to protect the second optical portion 170c during rotation between the main body portion 120 and the surveillance camera housing 115. Leads 160d through 160f extend through the main body portion 120 as shown in FIG. 3a.

Figure 4:
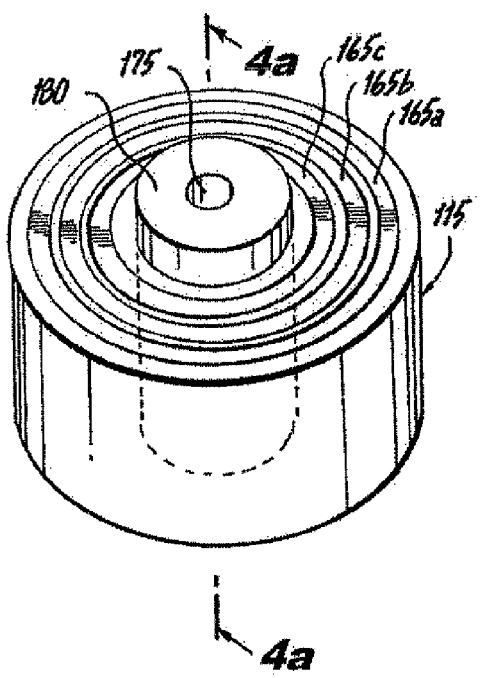
Figure 4A:
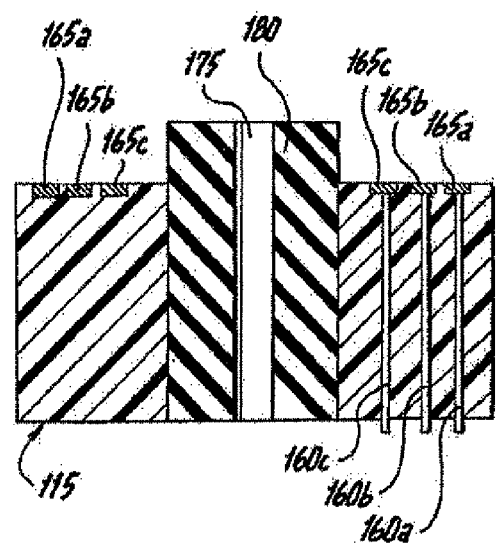

Turning now to FIGS. 3 and 4a, there is shown a top view and a cross sectional view of the surveillance camera housing 115. Turning first to FIG. 3, the conductors 165a, 165b, and 165c are shown as three conductive contact rings spaced from one another in a series of concentric rings. Leads 160b, and 160c (FIG. 4a) are energized by a power supply, which supplies current to conductors 165b, and 165c. Leads 160a through 160c extend through the surveillance camera housing 115 to connect to the surveillance camera 110, and the motor 130 for providing power and control signals. In the illustrated embodiment, the video signal is supplied along line 202. Signal 202 is converted to an optical signal by a controller 140 and transmitter 200, and is communicated to the first optical portion 170b by a laser transmitter 200 shown in FIG. 5. Thereafter, the signal is transmitted across the air gap 170a and to the second optical portion 170c. Various dimensions for the air gap 170a are possible and within the scope of the present disclosure.

Surveillance camera 110 is operatively connected to the laser transmitter 200. Laser transmitter 200 is a Agilent™ HFBR 1424, 820 nanometer, FC housed laser transmitter, however, this is merely one example, and the laser transmitter 200 can be any desired transmitter depending on the specific data rate, optical wavelength, interface type. The video signal from the surveillance camera 110 is converted to an optical signal and is transmitted from the optical transmitter 200 to the first optical portion 170b. Transmitter 200 can be integrated into the camera 110 as shown in FIG. 5.

The laser transmitter 200 further comprises a port (not shown) that couples to the output of the surveillance camera 110 as shown by line 210. The first optical portion 170b receives the signal from the laser transmitter 200 and the optical signal is communicated across the air gap 170a to the second optical portion 170c and to an optical receiver 205 along line 215. The optical receiver 205 is a laser receiver, for example, an Agilent™ HFBR 2422, 820 nanometer, FC housed receiver. Again, this is merely one example and the receiver 205 can be any desired receiver 205 depending on the specific data rate, optical wavelength, and interface type. There are two different notable embodiments when a laser receiver 205 receives the optical signal. First, the optical signal can be converted back into a different signal (video signal) for display purposes of the captured video images. In a real time monitoring condition, the laser receiver 205 can alternatively receive the optical signal, and then the signal can be communicated to an Ethernet connection, which also includes a fiber optic connector.

Figure 5:
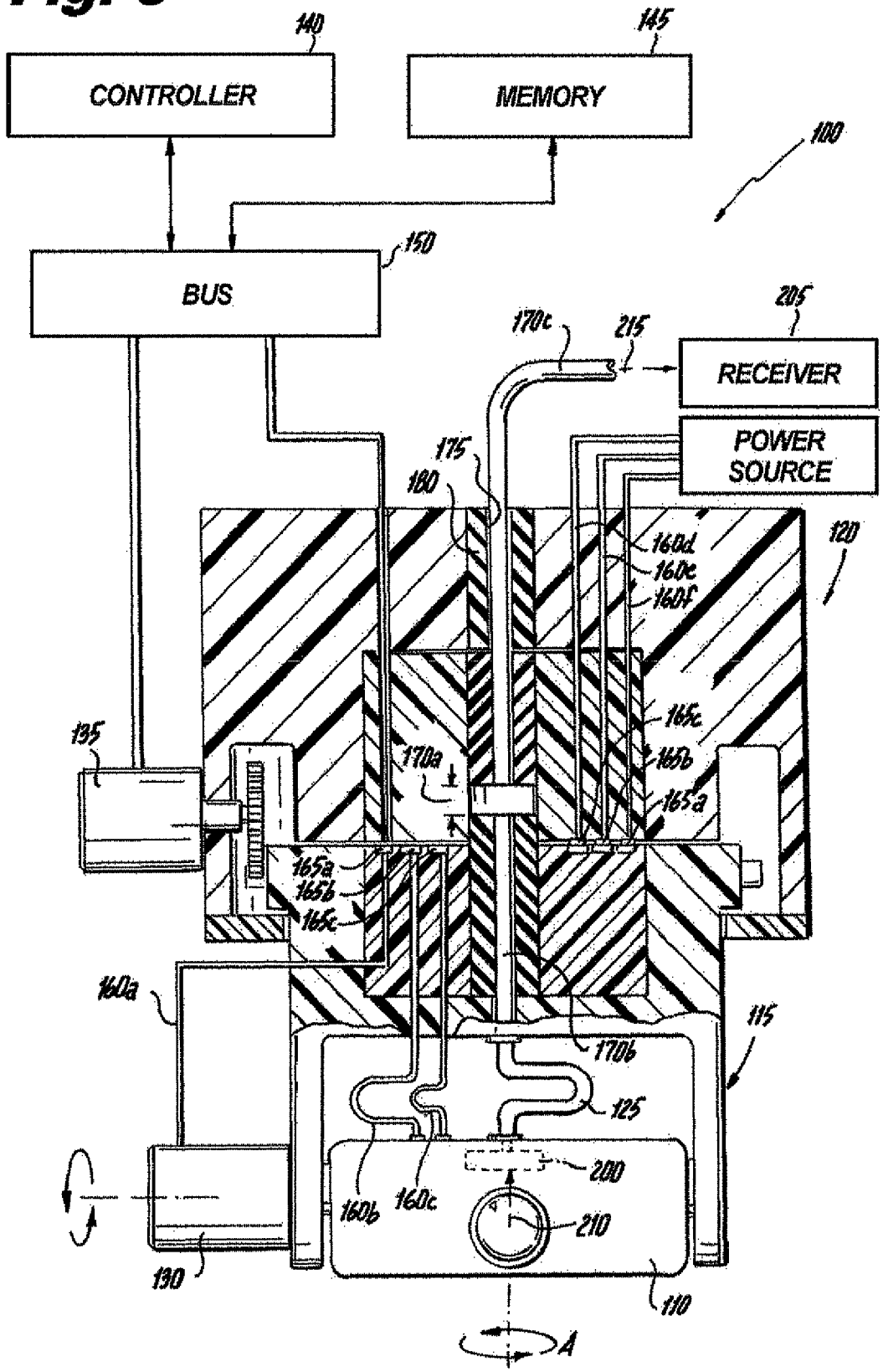
FIG. 5 shows a surveillance camera in a schematic view with a first fiber optic component and a second fiber optic component with an air gap being positioned between the first and the second fiber optic components for communicating signals at a high data rate representative of the video through the first and second optical components across the gap and to permit three hundred sixty degree rotation of the surveillance camera.
Figure 8:
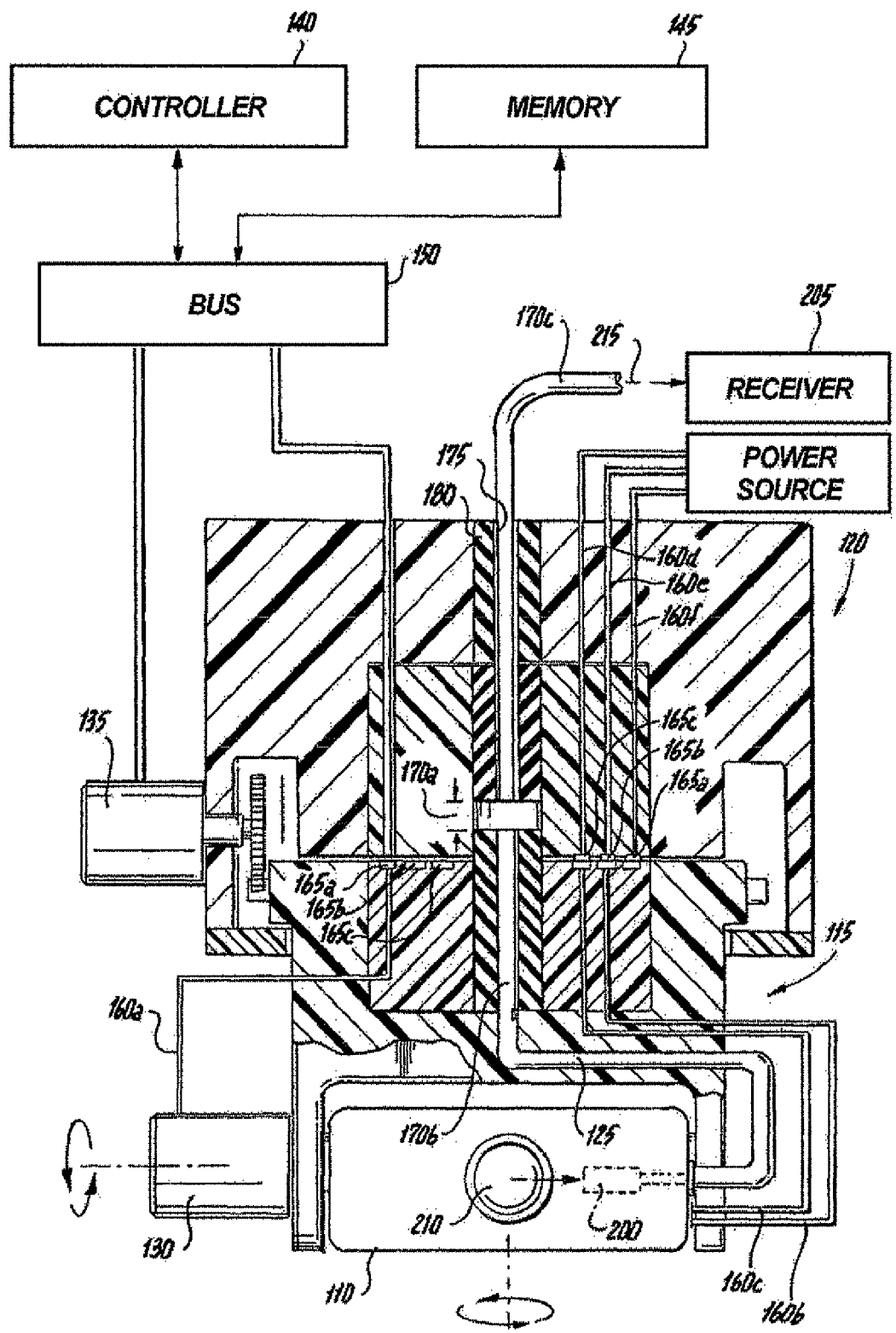
FIG. 8 shows a surveillance camera in a schematic view with two sets of fiber optic components.

FIG. 5 shows an embodiment with the first optical component 170b being a long soft fiber with slack. FIG. 8 shows an alternative embodiment. In this embodiment, leads 160d and 160e extend through the housing 115 to connect to a lateral side of the camera 110 to provide power to the camera 110. Additionally, the first optical component 170b also is connected to the lateral side of the camera 110 to follow the horizontal rotational mechanism 130.

Preferred embodiments and methods of the present invention discussed in the foregoing are to be understood as descriptions for illustrative purposes only, and it will be appreciated that numerous changes, substitutions, omissions, and updates thereof are possible without departing from the spirit and scope of the claims.

What is claimed is:

1. A surveillance camera comprising:
a rotatable housing;
a device supported by the rotatable housing that captures video signals;
a laser transmitter supported by the rotatable housing that receives the video signals from the device and that converts the video signals to optical signals;
a first component of a protective material having a cylindrical shape disposed in an aperture of the rotatable housing, the first component including a first aperture where the first component and first aperture are coaxial with an axis of rotation of the rotatable housing;
a stationary housing;
a second component of a protective material having a cylindrical shape disposed within an aperture of the stationary housing, the second component including a second aperture, wherein one of the first and second components is recessed into the corresponding aperture of the rotatable and stationary housings and the other of the first and second components has a portion that projects from the corresponding aperture of the rotatable and stationary housings wherein the corresponding aperture with the recessed component provides a receptacle that engages the projecting portion of the other component such that the first component rotates relative to the second component;
a first optical fiber that extends through the first aperture of the first component; and
a second optical fiber that extends through the second aperture of the second component, the first optical fiber separated from the second optical fiber by a gap within the receptacle, the first optical fiber operatively connected to the device, the first optical fiber receiving the optical signals and transmitting the optical signals to the second optical fiber across the gap to permit a continuous rotation of the first component relative to the second component with the second optical component communicating the optical signals to a destination.

2. The surveillance camera of claim 1, further comprising a conductor supported by at least one of the first component and the second component, the conductor receiving power from a power supply.

3. The surveillance camera of claim 1, wherein the surveillance camera is supported on a ceiling by the first component or the second component.

4. The surveillance camera of claim 1, wherein the first optical component is disposed through the first component.

5. The surveillance camera of claim 1, wherein the laser transmitter is connected to a video camera that captures images and communicates video signals to the laser transmitter.

6. The surveillance camera of claim 5, wherein video signals are converted to optical signals, and transmitted by the laser transmitter at about 820 nm wavelength.

7. The surveillance camera of claim 1, further comprising a plurality of electrical leads extending through at least one of the first component or the second component.

8. The surveillance camera of claim 2, wherein the conductor transfers power to a motor associated with the device that captures video signals.

9. The surveillance camera of claim 1, further comprising a protection material surrounding at least one of the first and the second optical components.

10. The surveillance camera of claim 1, wherein at least one of the first optical component and the second optical component transmits data across the gap in a range that includes about 100 Megabits through about 10 Gigabits.

11. The surveillance camera of claim 2, wherein the conductor comprises a plurality of conductive rings disposed between the first component and the second component.

12. The surveillance camera of claim 1, further comprising a receiver that is connected to the second optical component and that receives the optical signals.

13. The surveillance camera of claim 1, further comprising a laser transmitter that communicates with a laser receiver across the gap.

14. The surveillance camera of claim 1, wherein the laser transmitter transmits optical signals to an Ethernet switch, the data being communicated across the gap to a receiver being operatively coupled to the Ethernet switch.

15. An apparatus for capturing images and transmitting images to a destination by transferring optical signals between a target location to the destination, the apparatus comprising:
a rotatable housing;
a surveillance camera supported by the rotatable housing, the surveillance camera comprising a lens;
a laser transmitter supported by the rotatable housing;
a plurality of motor drives coupled to the rotatable housing and surveillance camera that are operable to move the surveillance camera in at least two planes;
the rotatable housing that supports the surveillance camera with the rotatable housing including a first component of a protective material having a cylindrical shape disposed within an aperture of the rotatable housing, the first component having a first aperture where the first component and first aperture are coaxial with an axis of rotation of the rotatable housing;

a conductor;

a second component of a protective material having a cylindrical shape, the second component including a second aperture, the second component is disposed within an aperture of a stationary housing wherein one of the first and second components is recessed into the corresponding aperture of the rotatable and stationary housings and the other of the first and second components has a portion that projects from the corresponding aperture of the rotatable and stationary housings wherein the corresponding aperture with the recessed component provides a receptacle that engages the projecting portion of the other component such that the first component and rotatable housing rotates relative to the second component and stationary housing;

the conductor being supported by at least one of the rotatable housing and the stationary housing, the conductor transferring electrical power from a power supply to the conductor and to at least one of the surveillance camera and motor drive;

a first optical fiber that extends through the first aperture of the housing;

a second optical fiber that extends through the second aperture in the second component, the first optical component being separated by the second optical component by a gap within the receptacle to permit the housing to rotate about three hundred sixty degrees relative to the second component; and the images captured by the surveillance camera are received by the laser transmitter and are converted from a video signal to an optical format and to optical signals communicated through the first optical fiber across the gap to the second optical fiber at a predetermined bandwidth being greater than 100 Megabits.

16. The apparatus of claim 15, wherein the surveillance camera is adapted to have a zoom function.

17. The apparatus of claim 15, further comprising a dome structure, and wherein the surveillance camera or a portion thereof is housed in the dome structure.

18. The apparatus of claim 15, wherein the optical signals are suitable to transmit at a predetermined bandwidth being in a range that includes 10 Gigabits.

19. The apparatus of claim 15, wherein the optical signals resist interference from electrical or magnetic sources.

20. The apparatus of claim 15, wherein the first optical component is coupled to the laser transmitter where the laser transmitter is rated at about 820 nm.

21. The apparatus of claim 15, wherein the second optical component is coupled to a laser receiver rated at about 820 nm.

22. A method for capturing video, and transmitting a signal from the surveillance camera to a remote location, the method comprising:

capturing an image using the surveillance camera in a predetermined format;

converting the image within a laser transmitter from the predetermined format to an optical format;

supporting the surveillance camera and laser transmitter within a rotatable housing;

providing a first component of a protective material disposed in an aperture of the rotatable housing;

providing a second component of a protective material disposed in an aperture of a stationary housing;

recessing one of the first and second components into the corresponding aperture of the rotatable and stationary housings and the other of the first and second components has a portion projecting from the corresponding aperture of the rotatable and stationary housings wherein the corresponding aperture with the recessed component providing a receptacle engaging the projecting portion of the other component such that the first component rotates relative to the second component; and transmitting an optical signal across a gap within the receptacle from the rotatable housing to the remote location.

23. The method of claim 22, further comprising providing power to the surveillance camera from a conductor with the surveillance camera operatively coupled to the conductor; and providing power to at least one motor operatively coupled to the surveillance camera with the motor adapted to articulate the surveillance camera at least two planes.

24. The method of claim 22, further comprising communicating the optical signal by a laser signal across the gap at a predetermined bandwidth being in a range that is greater than 100 Megabits.

25. The method of claim 22, further comprising capturing the image with functionality selected from the group consisting of a pan function, a zoom function and a tilt function.

26. The method of claim 22, further comprising communicating the optical signal across the gap by transmitting the data via a laser signal at a predetermined bandwidth being greater than 10 Gigabits.

27. The method of claim 22, further comprising protecting the surveillance camera in a dome shaped enclosure.

28. The method of claim 22, further comprising providing the gap between the rotatable housing that supports the surveillance camera and the surveillance camera so a portion of the surveillance camera can rotate continuously three hundred and sixty degrees relative to the rotatable housing.

* * * * *